United States Patent [19]
Fournier et al.

[11] Patent Number: 5,560,342
[45] Date of Patent: Oct. 1, 1996

[54] IN-TANK FUEL PUMP AND RESERVOIR

[75] Inventors: Kirk D. Fournier, Essexville; Charles H. Tuckey, Cass City, both of Mich.

[73] Assignee: Walbro Corporation, Cass City, Mich.

[21] Appl. No.: 565,868

[22] Filed: Dec. 1, 1995

[51] Int. Cl.$^6$ ................................................ F02M 37/04
[52] U.S. Cl. ............................ 123/509; 123/516; 137/38; 137/576
[58] Field of Search .................................. 123/509, 516, 123/497, 514, 510; 137/576, 38, 574, 579, 571, 572, 41

[56] References Cited

U.S. PATENT DOCUMENTS

| | | | |
|---|---|---|---|
| 4,546,750 | 10/1985 | Brunell et al. | |
| 4,697,995 | 10/1987 | Tuckey . | |
| 4,747,388 | 5/1988 | Tuckey . | |
| 4,807,582 | 2/1989 | Tuckey . | |
| 4,831,990 | 5/1989 | Tuckey . | |
| 4,878,511 | 11/1989 | Fox | 137/38 |
| 4,878,518 | 11/1989 | Tuckey . | |
| 4,893,647 | 1/1990 | Tuckey | 137/576 |
| 4,971,017 | 11/1990 | Beakley | 123/509 |
| 4,974,570 | 12/1990 | Szwargulski | 123/514 |
| 5,050,567 | 9/1991 | Sueuki | 137/576 |
| 5,220,941 | 6/1993 | Tuckey . | |
| 5,237,977 | 8/1993 | Tuckey . | |
| 5,253,628 | 10/1993 | Brown | 123/516 |
| 5,257,916 | 11/1993 | Tuckey . | |
| 5,341,842 | 8/1994 | Chih | 137/574 |
| 5,398,655 | 3/1995 | Tuckey . | |

*Primary Examiner*—Carl S. Miller
*Attorney, Agent, or Firm*—Barnes, Kisselle, Raisch, Choate, Whittemore & Hulbert

[57] ABSTRACT

An electric fuel pump and valve-controlled canister reservoir assembly mounted directly in a vehicle fuel tank with a pump main fuel inlet connected with a primary fuel filter disposed in the bottom of the tank. A pump fuel outlet supplies fuel for a vehicle engine and communicates through an engine bypass system with the canister reservoir to accumulate a reserve supply of fuel. The reservoir canister communicates with the pump inlet through a secondary filter and an inertia/gravity-activated valve module having a free rolling activator ball and associated can-like valve member cooperative with a large diameter annular valve seat to provide a sensitive valve with a large flow controlling cross-sectional area. The valve module thus provides an auxiliary supply of fuel to the pump inlet, preferably in bypass flow relation to the primary in-tank filter, and at a high flow rate when there is an interruption of fuel from the tank to the primary filter caused by adverse vehicle motion and/or orientation. The reservoir canister also may include an upright standpipe having an upper inlet opening at an elevation somewhat below the open top of the canister. The lower end of the standpipe opens to the valve chamber of the module to admit fuel to the pump inlet in bypass, always-open, flow relation with the module valve member and also in bypass flow relation to the primary filter.

15 Claims, 3 Drawing Sheets

IN-TANK FUEL PUMP AND RESERVOIR

FIELD OF THE INVENTION

This invention relates to vehicle fuel systems and more particularly to an electric fuel pump and reservoir disposed in a main fuel tank of a vehicle.

BACKGROUND OF THE INVENTION

Modern fuel delivery systems for automotive vehicles with engines having fuel injectors have utilized an electrically driven fuel pump in the vehicle main fuel tank. Typically, the electric fuel pump is mounted either directly in the vehicle tank or, as shown for example in U.S. Pat. Nos. 4,747,388; 4,807,582; 4,831,990 and 4,878,518, is mounted within a reservoir canister received in the tank. The canister reservoir supplies fuel to the pump in the event there is an interruption in the availability of fuel from the tank, such as when, under low tank fuel level conditions, cornering of the vehicle causes sloshing or movement of the fuel away from the pump inlet and to one side or the other of tank, or when essentially all of the fuel in the main tank has been consumed or used and the tank is excessively tilted by vehicle inclination on severe grades. Typically, the output of the fuel pump is greater than that required by the vehicle engine and the excess fuel is returned from the fuel injectors to the tank or to the canister reservoir.

Typically, in a no-return fuel system, there is only one fuel supply line between the fuel pump module and an engine fuel rail or manifold distributing fuel to the individual fuel injectors, and downstream of the fuel injectors there is no line returning unused fuel from the rail or manifold to the fuel tank. In such non-return fuel systems excess fuel is bypassed directly to the tank or canister reservoir, typically by a pressure regulator usually located closely downstream of the pump outlet within the tank or by a return line when the regulator is exteriorly remote from the tank.

In the aforementioned fuel systems in which the fuel pump is mounted in a fuel canister special valving has been provided between the canister, reservoir and the pump inlet to supply reserve fuel when the main tank supply is low; see for example the above cited U.S. Pat. No. 4,747,388. In this system, a valve actuated by pump suction lift of the primary fuel filter opens to provide fuel from the canister reservoir to the pump inlet when the pump inlet is starved because of low fuel or because of movement of fuel in the main tank to one side or the other during vehicle negotiation of a curve in the road. Further examples of use of a reservoir canister and special valving for supplying reserve fuel to a fuel pump are disclosed in U.S. Pat. Nos. 4,546,750 and 5,237,977. In these systems, under conditions of low fuel in the main fuel tank a valve associated with the canister responds to inertial forces created by side swerving motion of the vehicle, and/or in response to gravitational forces caused by excessive tilting of the vehicle on hills and grades, to open and allow flow of fuel from the canister to the fuel flow passage leading to the pump to thereby prevent starving of the engine due to no or low pump inflow from the main fuel tank.

Another system for preventing starving of the fuel pump and hence the engine due to low flow from the main tank is that set forth in co-pending application Ser. No. 08/496,950, filed Jun. 30, 1995 in the name of Charles H. Tuckey and assigned to Walbro Corporation. In this system an in-tank fuel pump is mounted adjacent an in-tank standpipe reservoir receiving bypass fuel from the pump, and a restricted orifice standpipe outlet and filter media of the primary fuel filter are utilized to provide an always-open reserve fuel flow path from the standpipe reservoir to the fuel pump inlet.

However, due to the greater fuel consumption demands of larger displacement vehicle engines, there still remains the need to provide an in-tank fuel reservoir system which is capable of maintaining an adequate supply of reservoir fuel by utilizing a reservoir shut-off valve so that reserve fuel is not drained from the reservoir when not needed by the pump and yet capable of providing a greater flow capacity of reserve fuel to the pump inlet when the pump inlet would otherwise be starved because of low tank fuel level allowing movement of fuel in the main tank away from the pump inlet in response to centrifugal, inertial and/or gravitational forces acting on the main body of fuel in the tank.

OBJECTS OF THE INVENTION

Accordingly, among the objects of the present invention are to provide an improved vehicle in-tank fuel pump system and assembly generally of the aforementioned type but capable of maintaining a greater reserve supply of fuel for a longer period of time during vehicle operation and yet also capable of supplying a higher flow rate of reserve fuel to the pump inlet from the reservoir sufficient to supply the high fuel demand of high fuel consumption vehicle engines.

Another object is to provide an improved vehicle in-tank fuel pump assembly of the aforementioned character provided with an improved "attitude activated valve" module controlling reserve fuel supply to the pump inlet and self-opening in response to the same forces tending to cause fuel starvation of the pump inlet from the main fuel tank supply under low tank fuel level conditions, whether they be gravitational forces from tank inclination, centrifugal forces from vehicle travel through a curved path, or inertial forces during acceleration and deceleration of the vehicle.

A further object is to provide an improved vehicle in-tank fuel pump system and apparatus of the aforementioned character in which the anti-starving flow of reservoir fuel is twice filtered, admission of air and fuel vapor to the pump inlet is inhibited during interruption of the supply of fuel from the tank, and in which the pump, reservoir and reservoir valve module are rugged, durable, reliable, of relatively simple design, economical to manufacture and assemble, and which in service have a long useful life.

SUMMARY OF THE INVENTION

In general and by way of summary description and not by way of limitation, the present invention fulfills the aforementioned objects by providing an electric fuel pump and valve-controlled canister reservoir assembly mounted directly in a vehicle fuel tank with a pump main fuel inlet connected with a primary fuel filter disposed in the bottom of the tank and a pump fuel outlet supplying fuel for a vehicle engine and communicating through an engine bypass system, such as a pump output line pressure regulator bypass valve, with the canister reservoir to accumulate a reserve supply of fuel. The reservoir canister adjacent its bottom communicates through a secondary filter and an inertia/gravity-activated valve module having a free rolling activator and associated can-like valve member cooperative with a large diameter annular valve seat to provide a sensitive valve with a large flow controlling cross-sectional area. The valve module thus provides an auxiliary supply of fuel to the pump inlet, preferably in bypass flow relation to the primary in-tank filter, and at a high flow rate when there is an interruption of fuel from the tank to the primary filter caused by adverse vehicle motion and/or orientation.

Optionally, in a second embodiment, the reservoir canister also includes an upright standpipe oriented with its upper inlet end opening to the interior of the canister fuel reservoir at an elevation somewhat below the open top of the canister (which in turn is open to the tank interior). The lower end of the standpipe opens to the valve chamber of the module to admit fuel to the pump inlet in bypass, always-open, flow relation with the module valve member and also in bypass flow relation to the primary filter. A float valve opens and closes the upper end of the standpipe to permit any vapor in the standpipe fuel to escape and, when the reservoir level drops below the standpipe inlet, to close the standpipe inlet to prevent air ingestion to the fuel pump.

Preferably, the secondary filter is an envelope surrounding the valve module inlet ports communicating with the canister reservoir, and is made of a mesh plastic material, such as a woven fabric, having openings with an average size not greater than about 100 microns. Liquid fuel will still freely pass through the secondary filter when the material is immersed in fuel. However, if wet with fuel when exposed to air (reserve supply low) this fine mesh material will resist and prevent the flow of air and other gas bubbles through the filter material. This is due to capillary action of the liquid fuel having wet and thereby remaining blocking the pores of the filter material against passage of vapor at least under low pressure drop conditions therethrough.

In either embodiment, when the supply of fuel from the tank via the primary filter is temporarily interrupted the pump can draw fuel from the canister reservoir through the valve-controlled passageway of the module into the pump inlet. In the second embodiment, if the reservoir fuel level is above the standpipe inlet, the pump inlet can be fed solely or primarily, as well as continuously, with fuel from the canister reserve supply, to reduce flow of fuel drawn from the tank via the primary filter. Preferably, in both embodiments, a conventional foot check valve is received in the pump between the primary filter outlet and inlet fitting to prevent flow of fuel from the reserve supply to the tank when the fuel supply from the tank is temporarily interrupted and/or being bypassed by the reservoir-to-pump fuel flow, and when the pump is not running. In the second embodiment, the interior of the canister surrounding the standpipe also provides a partial precipitate-type filter reservoir for fuel entrained particles to accumulate at the canister bottom instead of flowing into the elevated standpipe inlet. The quantity of reserve fuel in the canister above the standpipe inlet also augments the anti-pump-starving action of the system.

BRIEF DESCRIPTION OF THE DRAWINGS

The foregoing as well as other objects, features and advantages of the present invention will become apparent from the following detailed description of presently preferred embodiments and the best mode presently known of practicing the invention, and from the appended claims and accompanying drawings (which are to scale unless otherwise indicated) in which:

DETAILED DESCRIPTION

Figure 1:
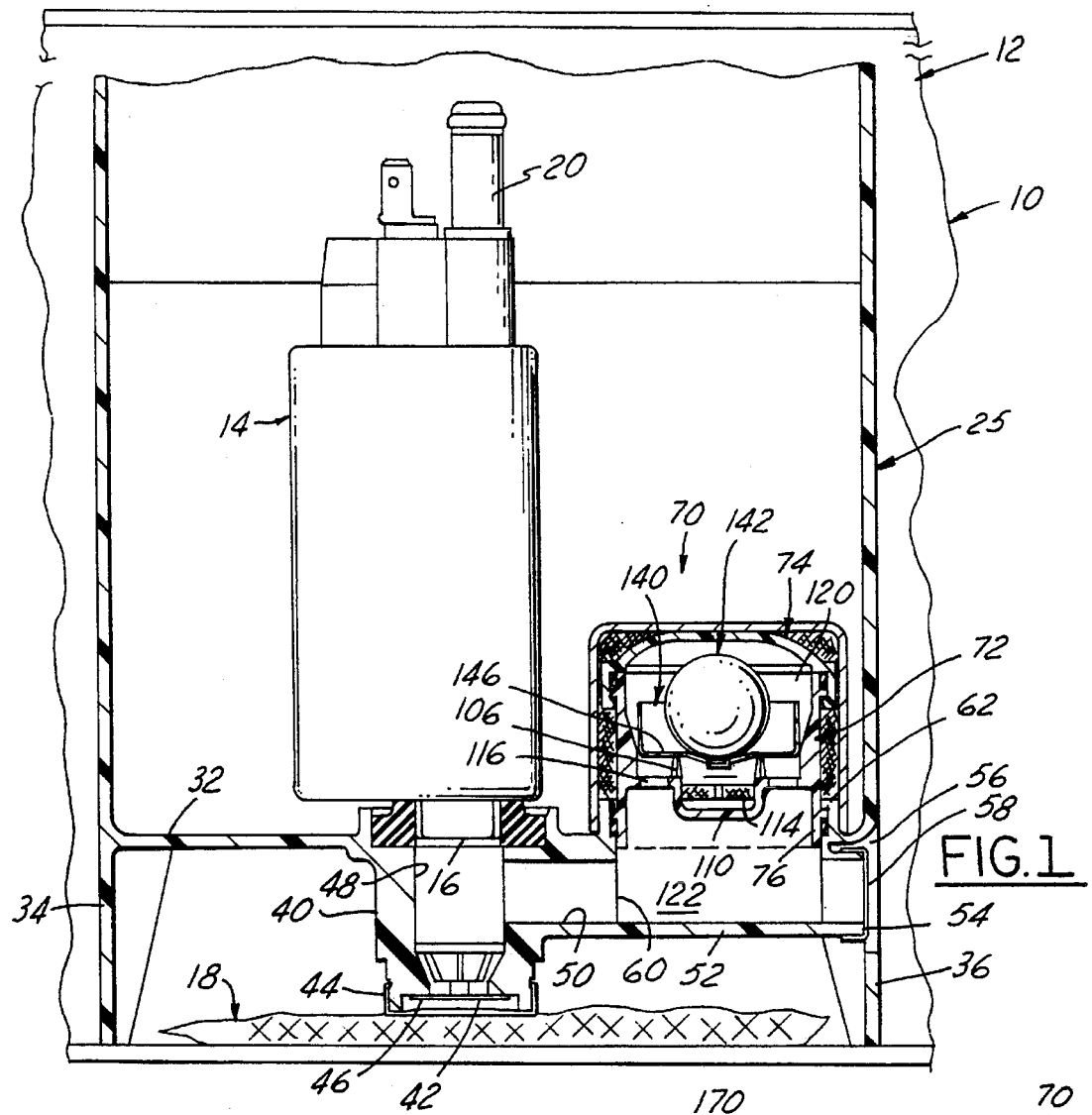
FIG. 1 is a fragmentary part central sectional and part vertical elevational view of a first embodiment of a pump and reservoir assembly embodying this invention adapted to be mounted in a fuel tank of an automotive vehicle, with the reserve supply module valve of the invention shown in closed condition.

Referring in more detail to the accompanying drawings, FIG. 1 illustrates a fuel pump and reserve canister assembly 10 of a first embodiment of this invention mounted in a fuel tank 12 of a vehicle, such as an automobile, for supplying liquid hydrocarbon fuel, such as gasoline, to a vehicle engine which is typically fuel injected. The assembly has an electric fuel pump module 14 with an inlet 16 connected to a conventional primary in-tank fuel filter 18 and an outlet nipple 20 connected to a conventional bypass regulator (not shown) which regulates the pressure of fuel supplied to the engine through a fuel line conduit (not shown) fed from fuel pump outlet 20. Assembly 10 also includes a fuel reservoir canister 26 having a cylindrical side wall 28 open at its upper end 30 (FIG. 6) to the interior of fuel tank 12 and closed at its lower end by bottom wall 32. Canister 26 has a plurality of spaced apart legs or feet 34, 36 dependent from wall 32 for supporting canister and fuel pump assembly 10 resting on the bottom wall 38 of fuel tank 12 (FIG. 1). A pump mounting and inlet fitting 40 is integrally dependent from bottom wall 32 and has an inlet opening passageway 42 at its lower end spaced slightly above tank wall 38 communicating with filter 18 which in turn is attached to fitting 40 by a snap on fitting 44. A conventional foot valve 46, typically a thin disc of rubberized fabric, is captured for movement in inlet passageway 42 between the closed position of FIG. 2 and the open position of FIG. 1 to permit flow of fuel from filter 18 via inlet 42 into the main inlet passage 48 of fitting 40 and thence into the pump inlet 16. A branch inlet bypass passageway 50 leading into passageway 48 is formed by a conduit 52 integrally molded with the underside of canister bottom wall 32 and extending radially outwardly from fitting 42 to terminate at its outer end 54 at an access opening 56 formed in leg 36. The outer end of passageway 50 is sealed by a cap 58 fitted onto the outer end of conduit 52. This arrangement facilitates coring of passageway 50 during injection molding of the plastic canister 26. Conduit 52 includes a cylindrical well portion 60 which opens upwardly through bottom wall 32 and is surrounded at its upper end by a cylindrical mounting rib 62 which protrudes upwardly into the interior of canister 26.

Figure 2:
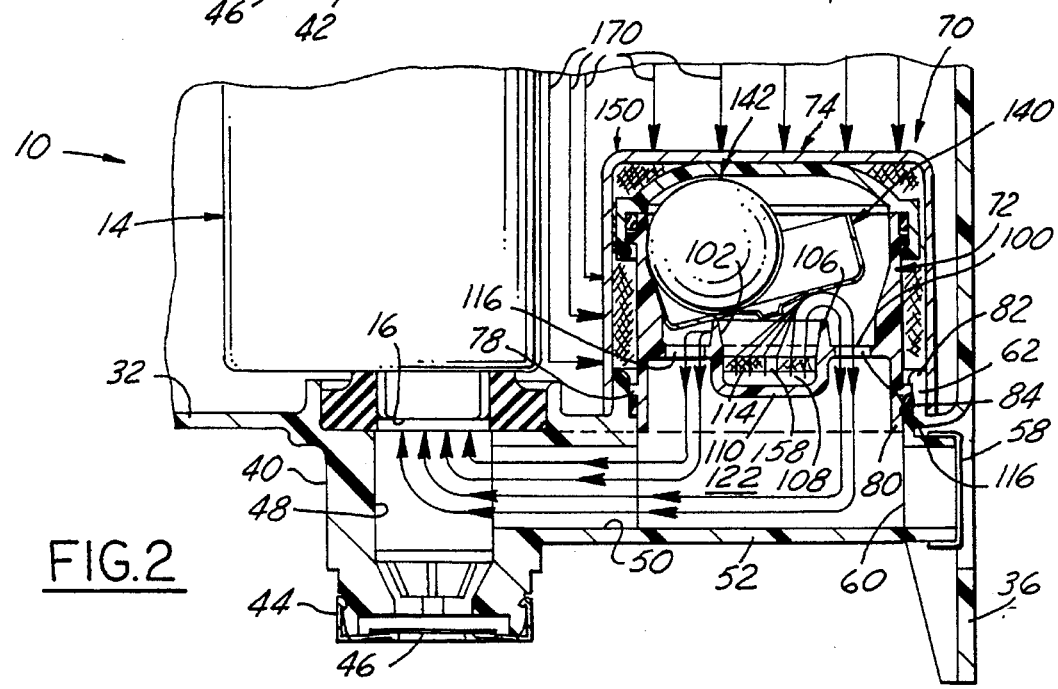
FIG. 2 is an enlarged view of a portion of FIG. 1 and showing the module valve in a fully open condition.

The components of the reservoir valve module subassembly 70 of the invention, which is removably mounted on annular rib 62, are best seen in FIGS. 2–5. Valve module 70 includes a two-part valve cage comprising a valve seat cup 72 and associated cup cap 74. Cup 72 has a cylindrical wall 76 open at its lower end and having a radially outwardly protruding peripheral rib 78 adapted for snap-in press fit into rib 62 of the bottom wall structure of canister 26. As best seen in FIG. 2, the bottom skirt portion 80 of wall 76, below rib 78, slides with a press fit into the upper end of the cylindrical wall of well 60 as rib 78 snaps past a radially inward rib protuberance 82 of mounting rib 62. An O-ring seal 84 is captured in compression radially between skirt 80 and rib 62 and axially captured between rib 78 and bottom wall 32.

The upper end of cup wall 76 has another radially outwardly protruding circumferentially continuous rib 86 spaced slightly below its upper end for snap-on mounting of cap 74 on cup 72. Cap 74 is imperforate and has a upwardly curved dome wall 88 encircled at its outer edge by an integral skirt 90 with a radially inwardly protruding annular lip 92 at its lower edge which snaps over cup rib 86 when cap 74 is pressed onto the cup. Another O-ring seal 94 is radially captured in compression between the upper end of wall 76 and skirt 90 and is axially captured between the cup rib 86 and an annular shoulder portion 96 of cap 74 which in turn seats on the upper end edge of wall 76.

Figure 3:
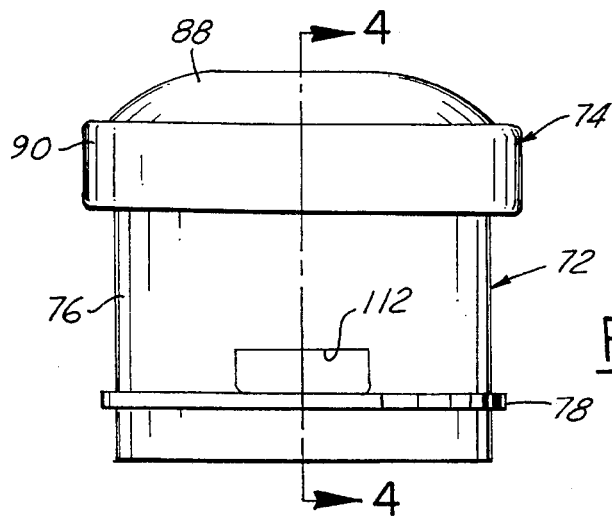
FIG. 3 is a side elevational view of the valve module container of FIGS. 1 and 2 shown by itself.
Figure 4:
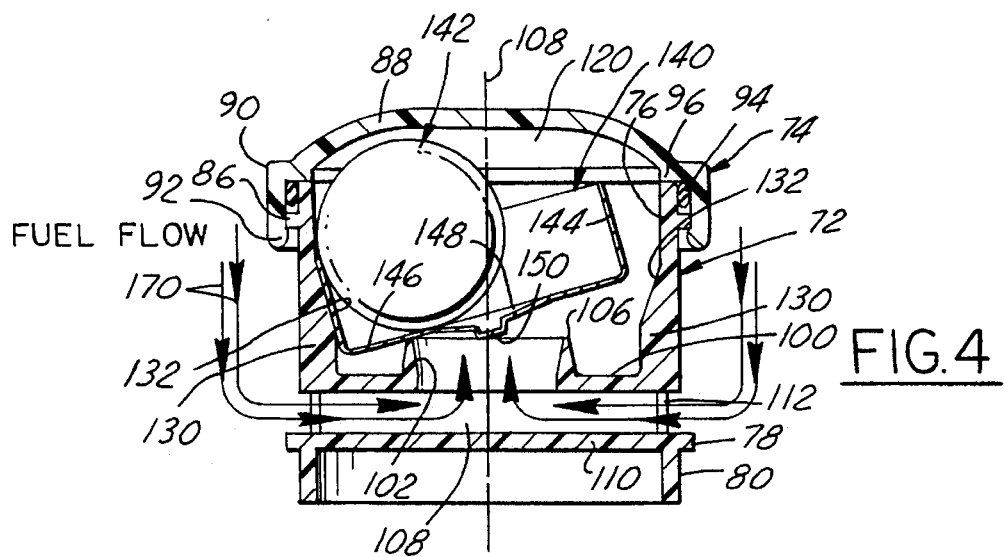
FIG. 4 is a cross-sectional view taken on the line 4—4 of FIG. 3.

A valve seat and fuel flow passageway structure having a large flow cross-sectional area is provided internally of cup 72, as best seen in the views of FIGS. 2 and 4. A partition wall 100 extends radially inwardly from the inner surface of wall 76 and has an upwardly protruding annular valve seat rib 102 defining a large cylindrical through opening 104 concentric with the axis of cup 72. The upper edge of rib 102 tapers to a narrow, rounded annular valve seat surface 106 disposed in a plane perpendicular to the central axis 108 of cup 72. Opening 104 defines a fuel flow passageway opening at its upper end to the valve chamber area 120 disposed above wall 100 within cup 72. The lower end of passageway 104 opens to an in-flow passageway 108 extending below and along cup wall 100 and diametrically of cup 72. As best seen in FIG. 2 passageway 108 is formed by the generally U-shaped (in cross section) trench portion 110 which extends across the underside of wall 100 and opens at its upper side to opening 104 centrally of the trench. Passageway 108 is open at its opposite ends to the exterior of the cup via a pair of diametrically opposite openings 112 and 114 in cup side wall 76 (FIGS. 3 and 4). Openings 112, 114 are disposed just above cup mounting 78 and hence just above the upper edge of the module mounting rib 62 of the canister bottom wall in the mounted condition of module 70 in the canister. As shown in FIG. 2, wall 100 is perforated by an annular row of circular openings 116 encircling valve seat rib 102 which provide fuel outflow passages downwardly from valve chamber 120 into the reserve fuel supply chamber 122 defined between wall 100 and bypass passageway wall 52 (FIGS. 1 and 2).

The interior of cup 72 also has a circumferentially spaced annular row of internal ribs protruding radially into chamber 120 above wall 100, a diametrically opposed pair of such ribs 130 being seen in FIGS. 1, 2 and 4. Ribs 130 are wider at their lower ends and extend axially upwardly and integrally from cup wall 100 parallel to the cup axis 108 to a predetermined elevation just above valve seat 106, and then taper so as to slant upwardly and outwardly to converge with the cylindrical inner surface of wall 76 just below rib 86. The slanted inner edges 132 of ribs 130 thus provide a circumferentially interrupted frusto-conical surface in valve chamber 120, and the spaces between the ribs circumferentially of the cup interior provide always-open fuel flow passageways between chamber 120 and wall outlet openings 116.

In accordance with another principal feature of the invention, valve module subassembly 70 also includes a cup-like valve member 140 and cooperative valve-actuating spherical ball 142 contained for limited free body motion within valve chamber 120 (FIGS. 1, 2 and 4). Valve member 140 is in the form of a cup having a cylindrical side wall 144 open at its upper end and closed at its lower end by an imperforate bottom wall 146 adapted to sealably seat on the annular valve seat 106 to thereby close flow passage 104 (as shown in FIG. 1). Wall 146 thus functions in the manner of an diametrically oversize valve disc in cooperation with annular valve seat 106. In the center of valve member wall 146 is a shallow conical ball-seating recess formed by a downwardly sloping conical central portion 148 concentric with the axis of valve member 140 and having a further downwardly recessed small center cup portion 150.

Valve actuating ball 142 is made as a spherical ball preferably solid, having a predetermined mass and diametrically sized to have a limited rolling clearance in valve cup 140, for example having a diameter about 65% of that of cup wall 144 of valve member 140. The diameter of valve seat 106 is about 54% of that of wall 144 in the exemplary embodiment illustrated in FIGS. 1, 2 and 4. Ball 142 is thus free to roll around the interior of valve cup member 140 within the confines of cup wall 144 as illustrated by comparing the center position of ball 142 in cup 140 of FIG. 1 with the radially outwardly displaced position of ball 142 illustrated in FIGS. 2 and 4. Displacement of ball 142 from cup-centered to the off-center positions of FIGS. 2 and 4 will cause valve cup member 140 to tilt off of valve seat 106 until its side wall 144 abuts the conical stop edges 132 of ribs 130. Vertical motion of ball 142 is limited in valve chamber 120 by its capture between bottom wall 146 of the valve cup member 140 and the undersurface of cap 74.

Figure 5:
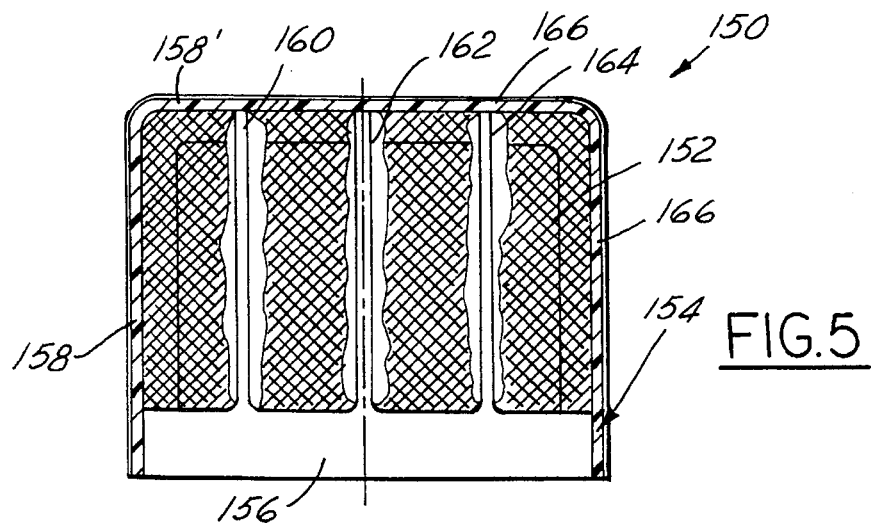
FIG. 5 is a vertical center sectional view of the secondary filter cage cap of the valve module of FIGS. 1 and 2 shown by itself.

As a further feature of the invention, valve module 70 also includes a secondary fuel filter structure which in assembly encapsulates cap 74 and cup 72 of the valve cage, as best seen in FIG. 2. The secondary fuel filter 150 of module 70 is shown by itself in FIG. 5 and comprises a inverted cup shape filter media 152 captured with a close fit within an open rib retainer cage 154. Preferably, filter media 152 is made of a conventional flexible porous filter material of a fine mesh, such as a plastic material having an average opening or pore size of about 60 microns, and is preferably preformed in cup shape complimentary to that of the interior of retainer 154 to slip fit therein as shown in FIG. 5. Retainer 154 is preferably a plastic injection molded part having an imperforate cylindrical mounting wall portion or skirt 156 at its lower end. An annular row of axially extending filter retaining ribs (e.g., eight ribs) extend axially upwardly from the upper edge of skirt 156, six of such vertical ribs 158, 160, 162, 164 and 166 being seen in FIG. 5 (the material of filter 152 being broken away to better illustrate ribs 160, 162 and 164).

The secondary filter 150 is assembled to valve cage subassembly 72/74 by telescoping filter 150 open end first downwardly onto the cap 74 and cup 72 to fully assembled condition as seen in FIGS. 1 and 2. This assembly step can be performed prior to installation of cage 72/74 in canister 26, or can be done after cup 72 is snap fit mounted onto the bottom wall mounting rib 62 of the canister. In final assembly with the canister, skirt 156 of the filter cage retainer has a slip press fit around the exterior surface of rib 62 as best seen in FIG. 2. The top wall of filter retainer 154 likewise has an open rib configuration formed by the upper end of each of the side wall ribs 158–166 being extended at their upper ends radially inwardly, as seen in FIG. 5 by top wall ribs 158' and 166' the top wall ribs being integrally joined at their center ends to form a diametrically extending array of spoke like top wall ribs to thereby retain the underlying top wall of filter media 152. Thus as diagrammatically illustrated in FIG. 2 by the fuel flow arrows 170, filter media 152 encompasses all of the exterior surfaces of cap 74 and cup 72 exposed to the interior of the fuel reservoir in canister 26. Hence liquid fuel can enter the captured filter media 152 around the entire circumference as well as through the top of retainer 154. However fuel can only enter into valve chamber 120 of the closed and imperforate cup/cap 72/74 via the cup side entrance ports 112 and 114, and only after passing through the secondary filter media 152.

In both exemplary embodiments of the invention as disclosed herein, fuel pump 14 is preferably a commercially available in-tank fuel pump as manufactured and sold by the Walbro Corporation, assignee of record herein. Pump 14 may either be a turbine type pump or a positive displacement type pump. A suitable positive displacement gear rotor type electric fuel pump is disclosed in U.S. Pat. No. 4,697,995, and a suitable turbine regenerative fuel pump is shown in U.S. Pat. No. 5,257,916, the disclosures of which are incorporated herein by reference and hence pump 14 will not be described in further detail.

Preferably, in the embodiment of the pump and reservoir assembly of FIG. 1 the outlet 20 of pump 14 is connected by suitable fuel line conduit to the fuel rail of the engine in a "no-return" type fuel delivery system. In such a system, the bypass pressure regulator (not shown) connected to the pump outlet is typically disposed above the pump and within the confines of canister 26 so that bypass fuel is discharged directly into the canister reservoir. In normal operation, pump 14 supplies a greater quantity of fuel to the pressure regulator than is needed to meet the demand of the operating engine. The regulator maintains a substantially constant pressure of fuel supplied through the fuel delivery the line to the fuel rail of the engine, and bypasses or discharges excess fuel through its outlet into the canister reservoir. Typically the pressure regulator has a flow rate control valve actuated by a diaphragm in response to changing fuel demand in the engine to maintain a substantially constant output pressure. Typically the pressure regulator will maintain a substantially constant output pressure, such as 50 psig, with a pressure drop of about 1 psi over the full range of variation of the fuel flow rate to the engine of from 0 to 40 gallons per hour. Suitable pressure regulators for such no-return fuel systems are disclosed in U.S. Pat. Nos. 5,220,941 and 5,398,655, the disclosures of which are incorporated herein by reference and hence not described in greater detail.

Primary in-tank filter 18 is also conventional and comprises a bag or envelope formed from a sheet of flexible filter material of a fine mesh, such as a plastic material, which is heat sealed together around its periphery. The interior of the filter envelope communicates through its outlet fitting 44 with the inlet passageway 42 of the canister inlet fitting 40. Typically, a flexible baffle (not shown), which can be made of plastic material, is received in the envelope of filter 18 to prevent the flexible bottom wall of the filter bag from collapsing or being forced upwardly onto outlet fitting 44 so as not to restrict flow of fuel through the outlet into the pump inlet passageway 42. In use, filter 18 and inlet 42 of fitting 40 lie closely adjacent to bottom wall 38 of fuel tank 12, typically in the lowermost portion of the fuel tank.

In normal use, fuel tank 12 is at least partially full of a liquid fuel, such as gasoline, to a level above filter 18 so that the filter and pump inlet 42 are completely immersed in such fuel. In normal operation of pump 14 the fuel in the tank is drawn through filter 18 into inlet passageway 42 and flows upwardly past the open foot valve 46, through fitting inlet passageway 40 and into the pump inlet 16. Such fuel is discharged from the outlet 20 of pump 14 to the inlet of the pressure regulator which in turn supplies fuel through its outlet to the engine rail at a substantially constant pressure, such as 50 psig. The regulator maintains a substantially constant output pressure by bypassing a portion of the fuel supplied to its inlet, and discharges such bypass fuel through its bypass outlet directly into the reservoir of canister 26. Thus in normal operation of pump 14 the fuel in the canister reservoir accumulates and rises to a level which is adjacent to or above the pump outlet or regulator bypass outlet, and in some normal operating conditions, such as extended periods of the engine idling or operating under lower load, the fuel level rises to the top of canister 26 and over flows through the open upper end of the canister into the fuel tank.

In normal operation of the first embodiment of the pump and reservoir assembly embodying this invention, with the vehicle oriented generally horizontally, the central longitudinal axes of pump 14, canister 26 and valve module 70 will be oriented generally vertically. With the vehicle so oriented horizontally, and while either stationary or traveling in generally straight line motion, and without undergoing undue acceleration or deceleration, the weight of ball 142 will gravitationally bias it to roll into and rest on the center depression 148 of valve member cup 140, as shown in FIG. 1. In this condition, ball 142 thus gravitationally biases the flat perimeter portion of cup bottom wall 146 into flat abutment with valve seat 106, thereby closing communication between fuel inflow passageway 108 and valve chamber 120. Hence all of the fuel flowing into pump inlet 16 will be drawn from the fuel tank through primary filter 18 and past the open foot valve 46.

When the fuel level in tank 12 becomes low enough, and during abnormal operation or orientation of the vehicle, such as when negotiating curves at relatively high speeds, or going up and down a steep hill, or parked on a steep grade, or even during very rapid acceleration and deceleration of the vehicle, the remaining body of liquid fuel in the tank will be subjected to centrifugal, gravitational and/or inertial forces that will cause the tank fuel to move away from the primary filter 18, thereby momentarily interrupting the supply of fuel from the tank through filter 18 to the pump inlet 16. However, the same centrifugal, inertial or gravitational forces, which starve the pump inlet of tank fuel at primary filter 18 to cause such fuel interruptions, will also simultaneously act on ball 142 to force it to move off-center of valve cup 140 within chamber 120, and in the same direction of movement as that of the tank fuel. Depending upon the nature of the abnormal vehicle operational condition, this could be in a random direction anywhere radially outwardly a 360° circle centered on the axis of valve seat 106. If the magnitude of such force is sufficient, it will roll ball 142 entirely off of the center seat 148 of cup 140 and radially outwardly against cup side wall 144 with sufficient force to cause the ball to tilt cup 140 until cup side wall 144 hits against rib stop edges 132. This action in turn tilts sealing wall 146 of cup 140 off of valve seat 106 to its maximum open inclination relative thereto. It is to be noted that due to the cooperative annular geometry of ball 142, valve cup 140, valve seat 106 and valve chamber 120, the extent of valve opening is thus independent of the directional vector of the ball activating force transverse to the valve seat axis.

When valve member 140 is thus opened by ball rolling actuation, reservoir fuel can be drawn into pump inlet 16 via the flow path of filter media 152, cup inlets 112 and 114, inflow passageway 108, valve passageway 104, past valve seat 106 into valve chamber 120, and thence out of valve chamber 120 via wall outlets 116 into bypass chamber 122, and thence via bypass passageway 50 to inlet 16. In the meantime the pump induced pressure drop across foot valve 46 has tended to maintain it open, but the capillary blocking action of the residual fuel clinging to the mesh of filter bag 18 will tend to prevent passage therethrough of air bubbles and vapor from the tank. Moreover, this pressure drop across foot check valve 46 is greatly diminishing by the opening of valve member 140 off valve seat 106 to admit a large volumetric rate of flow of reservoir fuel to flow in bypass relation to foot valve 42 into pump inlet 16, thereby further diminishing any tendency for air or gas bubbles to be drawn through filter bag 18.

It will thus be seen that during such fuel interruptions from abnormal forces exerted on low level tank fuel from vehicle operation or orientation, pump 14 receives reserve fuel from the reservoir of canister 26. Hence pump 14 is not starved of fuel as a result of tank fuel being forced away from the main tank-to-pump inlet 42.

It will also be noted that the reservoir supply of fuel in canister 26 will undergo a second filtration as a result of its passage through filter media 152, the first filtration stage having occurred when the fuel was first inducted from tank 12 into the fuel delivery system via filter bag 18 and tank-to-pump main inlet 42. This secondary filtering insures that any fine particles or debris which nevertheless may have entered the fuel system initially through filter 18, or subsequently from a location downstream of filter 18, and also those which may have collected on the bottom wall 32 of canister 26, do not enter the flow of reserve bypass fuel being fed from the canister reservoir to the pump when valve member 140 is open to allow such flow.

In addition, it also is to be understood that during certain conditions of operation, even when ball 142 remains centrally seated in valve member cup 140 by gravitational forces, pump 14 can still draw some bypass fuel from the canister reservoir if and when a sufficient pressure drop is created between pump inlet 16 and canister reservoir fuel. It will be seen that the central portion of valve member bottom wall 146 disposed radially inwardly of its annular sealing engagement zone with valve seat 106 is constantly exposed, via passageway 109 and valve passage 104 (FIG. 4), to the gravity-induced positive pressure head of the body of fuel in canister 26. The oppositely disposed upper surface of wall 146 is also constantly subjected to the negative pressure created in valve chamber 120 as communicated thereto from pump inlet 16 via bypass passage 50, chamber 122 and well openings 116. Hence at some predetermined pressure drop value oriented upwardly and acting between the opposed working faces of cup wall 146, valve member 140 will be lifted partially open by valve-unseating fluid pressure forces sufficient to overcome the gravitational force of ball 142 tending to seat the valve closed. Hence the net opening force will cause valve 140 to open a corresponding amount to thereby allow fuel to flow from the canister reservoir to pump inlet 14 under these intermediate type conditions. These conditions can occur when no valve-opening ball actuating force is being exerted on ball 142, and when there is no fuel at the main filter 18, and as long as filter 18 is wet with fuel and providing the capillary sealing effect of the pores in the filter 18, and so long as pump 14 is running. Due to the relatively large diameter of the annular valve seat 106, less pressure drop is required across the valve member to force this leakage-type flow of fuel between the valve seat and the valve member.

The large diameter of valve seat 106 and corresponding large valve opening flow passage 104 also greatly increase the rate of fuel flow from the canister reservoir or to the pump to satisfy a high fuel input demand by the engine without thereby significantly increasing the overall size of valve module 70 nor the diametrical dimensions of canister 26 required to accommodate valve module 70 in side-by-side canister-mounted relation with pump 14. Moreover, due to the sensitivity of operation of valve module 70, as when valve member 140 is actuated open by motion of ball 142 off its center seat and/or by fuel pressure drop forces acting thereon, and the capability of valve module 70 to provide a high volumetric flow rate of reservoir fuel to the pump, even rapid and/or prolonged pump-starving transient motion of the low level body of fuel in the main tank will not cause a noticeable interruption in fuel delivered to the engine by pump 14, even when engine fuel demand is high.

When pump 14 is shut off and not running the pressure head of fuel in canister fitting inlet passage 48 will cause the sensitive foot valve 46 to quickly close and remain so closed. Hence, because valve 46 is closed even if valve module 70 is in open condition (as when the vehicle is parked on a steep grade) fuel cannot drain out of the reservoir in canister 26. Likewise, when pump 14 is running and valve module 70 is opened by forces acting on ball 142, and the reservoir fuel is flowing past valve seat 106 at a higher flow rate han needed by pump input demand, then the resultant pressure drop acting downwardly across foot valve 46 will likewise cause it to close, thereby also preventing such excess canister fuel supply from flowing out into the fuel tank.

During normal vehicle operation and orientation, gravitational forces acting on ball 142 will tend to keep it centered in cup depression 148. Hence this central seating recess of the valve cup tends to stabilize ball 142, tending to keep it centered on valve member 140 so as to exert generally uniform closing force around the annular valve seat 106. Nevertheless, normal vehicle vibration induced by road travel can exert vertical forces parallel to the valve module axis 108 tending to lift ball 142, and when of sufficient magnitude can cause intermittent opening of valve module 70 and thereby allow reservoir fuel to feed the pump inlet, in addition to fuel flow from the fuel tank through filter 18 and main inlet 42. However, the resultant quantity of outflow of canister reservoir fuel fed to pump inlet 16 in parallel with the main fuel inflow past foot check valve 46 from the fuel tank is normally insufficient to empty canister 26 of reserve fuel due to the higher inflow rate to the canister reservoir from the bypass regulator.

Second Embodiment

Figure 6:
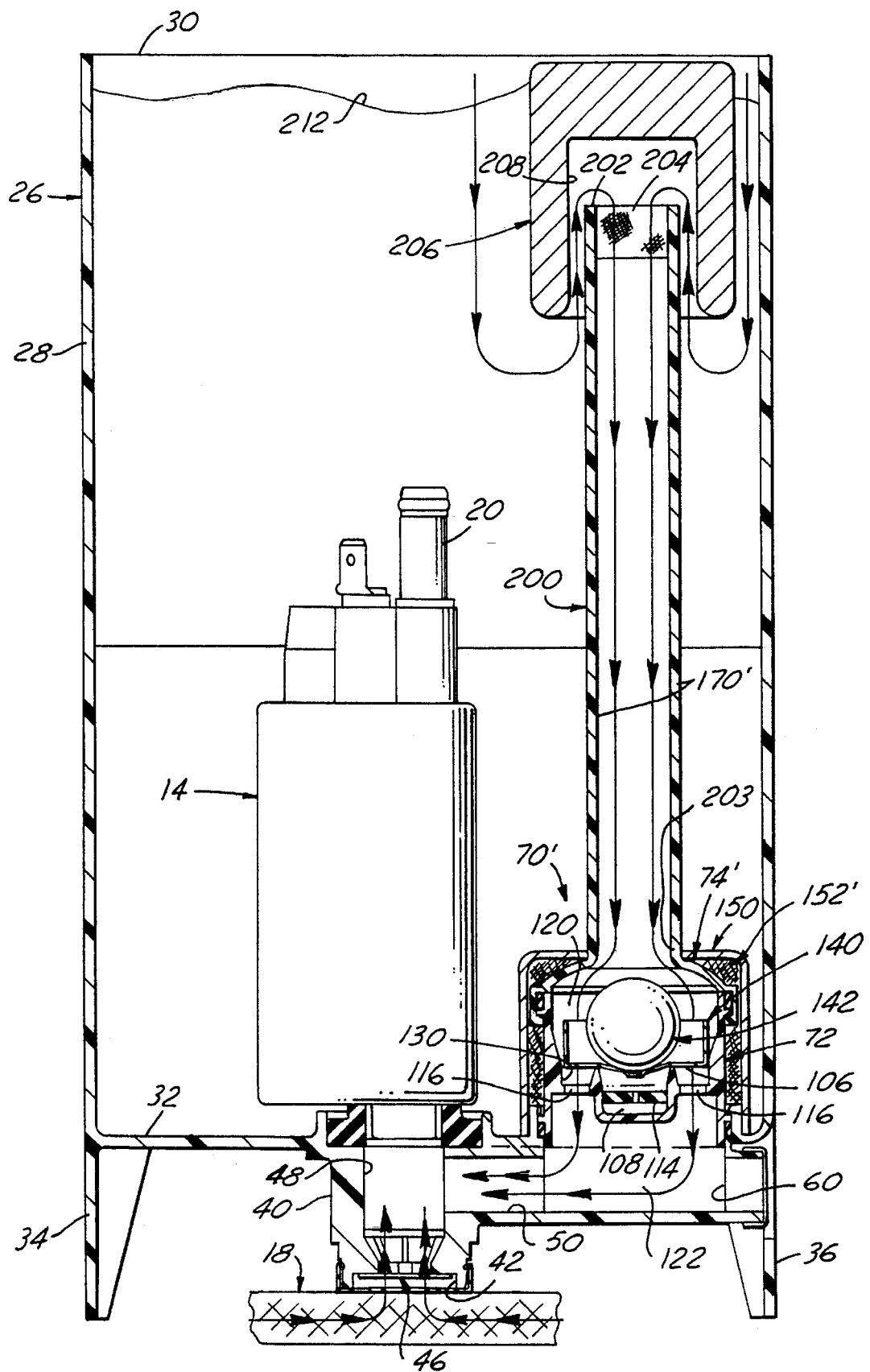
FIG. 6 is a view similar to that of FIG. 1 but illustrating a second embodiment utilizing the reserve supply standpipe and associated float valve, as combined with a modified valve module (valve shown closed).

FIG. 6 illustrates a second embodiment of a pump and reservoir assembly also provided in accordance with the invention, and primarily intended for use with return-type tank-to-engine fuel delivery systems. Typically in such systems fuel delivered to the fuel rail in excess of engine demand is returned from a point downstream of the rail, usually from the bypass outlet of a pressure regulator mounted on the rail or other engine structure and through a regulator bypass outlet return line (not shown) which empties into the reservoir of canister 26. Normally in such systems the fuel pump, when running, runs at full speed during normal operation and the excess fuel is bypassed from the fuel injectors through the pressure regulator and returned into the canister reservoir to thereby keep the reservoir full of fuel. Because of engine heating of returned bypass fuel, it has long been the practice to return the hot fuel directly to the canister rather than to the fuel tank to thereby reduce heat transfer to the fuel in the tank. Another advantage of such canister reservoir systems is that the bypass fuel returned to the canister, whether from an in-canister bypass regulator in a no-return system or from a return line connected to a remote bypass regulator in a return-type system, bypasses the fuel in the tank and goes direct to the pump. Hence bypass fuel does not reenter the tank and go through the primary filter 18. The corresponding reduction in the amount of fuel flow drawn from the tank through the primary filter 18 results in less contamination being carried from the fuel tank into the filter, thereby extending the life of the primary filter by delaying the rate of contaminate clogging of its filter mesh.

In the second embodiment of FIG. 6, elements previously described are given like reference numerals and modified elements alike in structure and/or function to those previously described are given a corresponding reference numeral raised by a prime suffix. Thus in the second embodiment, cup cap 74' is modified at its upper end to integrally join to the lower outlet end of a vertical standpipe 200, the longitudinal axis of which extends parallel to the axis of pump 14 and canister 26. The top wall of filter cage 150', as well as the top wall of filter media 152', are each provided with a suitable central circular opening for passage therethrough of the neck 203 of standpipe 200. The upper end 202 of standpipe 200 is disposed at an elevation spaced somewhat below the open upper end 30 of canister 26, as shown in FIG. 6. If desired, a suitable filter 204 may be inserted into the upper end of standpipe 200. A float valve 206 in the form of an inverted cup is disposed telescopically over the upper end of standpipe 200. Float 206 has a cylindrical interior side wall 208 having a relatively large flow clearance with the outer periphery of the upper end of standpipe 200. The flat interior end wall 210 of float 206 is adapted to rest on the upper end 202 of standpipe 200 when the float is lowered onto the same by the reservoir fuel level 212 falling below the elevation illustrated in FIG. 6 a distance corresponding the spacing between valve surface 210 of float 206 and the upper end 202 of tube 200, and vice versa.

In the operation of the second embodiment of FIG. 6 during normal operating conditions when tank fuel is available for ingestion through filter 18 past foot valve 46 to be drawn into pump inlet 16, canister 26 will normally be full of fuel at least to the level 212 or maybe overflowing into the tank, depending upon engine fuel demand. Under such conditions, float 206 will be bouyantly elevated to keep open the upper end 202 of standpipe 200, which is submerged under these conditions in the body of reserve fuel in the canister. Hence, as diagrammatically illustrated by the fuel flow arrows 170' in FIG. 6, bypass reservoir fuel can then flow up into the inverted cup cavity of float 206 and then flow downwardly within standpipe 200 to valve chamber 120. It will be noted that such fuel can continue to freely flow around and past valve cup member 140 in the clearance channels provided by and between the annular row of ribs 130, and thence flow via outlets 116 in interior transverse wall 100 of cup 72 into lower chamber 122, and thence via passageway 50 to pump inlet 16. It will thus be noted that this flow path through valve module 70' is always open even when valve member 140 is closed on valve seat 106. Hence pump 14 can be fed with reserve fuel from chamber 26 so long as the upper end of standpipe 200 is kept open by the reservoir fuel level elevating float 206 to keep open standpipe inlet 202. Since the pressure drop through this standpipe-valve module bypass flow path to pump inlet 16 under these conditions is considerably less than that through filter 18 and foot valve 46, all or most of the fuel drawn into pump inlet 16 will be via standpipe 200 from the canister reservoir supply.

Hence the second embodiment utilizing valve module 70' also provides the advantages of a standpipe-type canister containment of fuel for receiving and providing a reserve supply of bypass fuel to feed pump. That is, the high elevation of standpipe inlet 202 relative to the height of the canister reservoir from bottom wall 32 to top 30 allows dirt and other contaminating particulates entrained in the fuel to precipitate from the body of canister-contained reserve fuel onto canister bottom wall 32 so that such standpipe orientation in the canister is operable as a precipitate filter for fuel drawn into the upper end of the standpipe.

When the canister fuel level 212 drops sufficiently to cause float 206 to close the upper end of standpipe 200, and under normal conditions with valve module 70' in closed condition, pump 14 will then draw all of its input fuel through primary filter 18. However, in the event that pump 14 should be starved of such primary fuel flow from tank 12 due to the aforementioned gravitational, centrifugal and/or inertial forces acting on the body of low level fuel in the main tank, these same forces will actuate ball 142 to open valve member 140 to permit reserve fuel flow from the lower reaches of the canister reservoir through the same pathway described in conjunction with the first embodiment valve module 70, and as best illustrated in FIG. 2. Hence an immediate high flow rate of reservoir reserve fuel is made available to pump inlet 16 via bypass chamber 122 and passageway 50, as in the first embodiment.

In addition, valve module 70' will also provide reserve fuel flow through module 70' from the canister reservoir via module side inlets 112 and 114 whenever valve member 140 is opened, even when sufficient reservoir fuel is available to feed into the upper end of standpipe 200. Parallel flow of reservoir fuel can then occur from the lower reaches of the reservoir as well as from the upper end of standpipe 200 to thereby provide all or a majority of the fuel supply to pump inlet 16, the ratio fed via these two reservoir flow paths depending upon the relative pressure drops existing in these two parallel reserve fuel pathways to chamber 122.

Standpipe 200 also serves as a secondary anti-pump-starvation fuel supply system inasmuch as forces acting on a low level fuel body in main tank 12 causing starvation of pump inlet 42, although likewise acting on the body of fuel in the reservoir of canister 28, often will not cause fuel level 212 to drop sufficiently in the vicinity of float 206 to close standpipe 200. Hence reserve fuel will remain available for flow into the standpipe under such main tank pump starvation conditions.

From the foregoing description, it will now be apparent that both of the exemplary but preferred embodiments of the invention as described hereinbefore and with reference to the drawing figures, amply fulfill the aforestated as well as other objects of the invention and provide many advantages and features over the prior art. The inertia/gravity actuated valve modules 70 and 70' of the invention greatly increase reserve fuel volumetric flow rate available to the inlet of the pump over that of prior anti-starvation reserve fuel systems, thereby providing an improved system capable of meeting the needs of high fuel consumption vehicle engines. The rolling-ball-actuated can valve arrangement both by itself and in conjunction with the large diameter annular valve seat 106, provides a very sensitive, fast acting valve action. The valve thus is rapidly self-opening in response to the same forces tending to cause fuel starvation of the pump inlet under adverse low tank fuel level conditions, whether they be gravitational forces resulting from tank inclination, centrifugal forces from vehicle travel through a curved path, or inertial forces during acceleration or deceleration of the vehicle.

Modules 70 and 70' also provide an anti-starving flow of reservoir fuel to the pump inlet that is twice filtered, once initially through the primary filter 18 and then subsequently through the secondary filter 152 of the module. Admission of air and/or fuel vapor to the pump inlet 16 is inhibited by the capillary blocking action of residual fuel wetting the mesh of filter bag 18 during interruption of the supply of fuel from the tank. Filter media of 152 of the secondary filter 150 will likewise inhibit passage of air and/or fuel vapor bubbles from the fuel in the canister reservoir so that such air or other gaseous bubbles tend to rise to the open top of the canister for effervescence into the fuel tank head space. In the second embodiment, standpipe 200 also further inhibits air and gas vapor bubble ingestion due to the shielding action of float 206 and optionally the presence of inlet filter 204. Under conditions when no fuel remains in the reserve supply in canister 28, and pump 14 is drawing its fuel solely from the main tank through filter 18, the closure of float 206 onto standpipe 200 and the vapor barrier provided by the encircling filter media 152 or 152' relative to module inlets 112,114 will prevent or greatly inhibit admission of air or vapor bubbles into the valve module.

It will also now be appreciated that canister 26 and associated valve modules 70 and 70' can be economically manufactured in mass production using plastic injection molding equipment and processes to thereby provide an in-tank pump and reservoir assembly which is rugged, durable, reliable, of relatively simple design, economical to manufacture and assemble and which in service have a long useful life.

It is also to be understood that, although the foregoing description and drawings describe and illustrate in detail various preferred embodiments of the present invention, to those skilled in the art to which the present invention relates the present disclosure will suggest many modifications and constructions as well as widely differing embodiments and applications without thereby departing from the spirit and scope of the invention. The present invention, therefore, is intended to be limited only by the scope of the appended claims and the applicable prior art.

What is claimed is:

1. An in-tank fuel pump and reservoir for use in a fuel tank subject to pump starvation due to lateral bodily fuel shifting forces under low tank fuel level conditions comprising in combination an in-tank fuel reservoir and pump assembly including a canister and a fuel pump for pumping main tank fuel from the interior of a subjacent primary in-tank fuel filter into an inlet of said pump and delivering the fuel via an outlet of said pump to an engine, a canister valve module having an inlet passageway communicating with an interior reservoir of said canister and an outlet passageway communicating with said pump inlet, an annular valve seat structure and an associated valve-controlled passageway in full fuel flow communication between said module inlet and outlet passageways, said valve-controlled passageway comprising an open annulus having its axis oriented parallel to the normal vertically oriented axes of said fuel pump and fuel canister, a valve seat formed on the upper edge of said annulus with a sealing surface lying in a plane perpendicular to said vertical axes, a valve can member having a peripheral side wall and a bottom wall closing one end of said valve can member, the exterior undersurface of said can wall being adapted to seatably rest on said annular valve seat to close communication between said canister inlet and outlet passageways, and a valve actuating ball loosely disposed on the upper interior surface of said can bottom wall and being diametrically dimensioned relative to the diameter of said can peripheral wall to permit said ball to roll back and forth on said can bottom wall within the confines of said can side wall, the outside diameter of said can being greater than diameter of said valve seat such that shifting of said ball off-center relative to the can center imparts tilting forces to the can to tiltably lift the same from the valve seat in response to the same forces acting on said ball in a direction transverse to the valve seat axis as those imparting the lateral bodily fuel shift in the fuel tank.

2. The combination set forth in claim 1 wherein said can bottom wall is generally planar except for a central depressed are adapted to nestably partially receive said ball therein for stabilizing said ball in said can.

3. The combination set forth in claim 1 wherein said canister valve module comprises a cup-like enclosure with an annular side wall encircling said valve can and ball and dimensioned to limit maximum tilting movement of said can by ball actuation thereof relative to said valve seat, said enclosure having a top wall adapted to limit upward movement of said ball when resting on said can bottom wall and a bottom wall constructed and arranged to define said canister inlet passageway with at least one inlet opening in said enclosure side wall communicating with the exterior of said enclosure and an outlet opening communicating with and valve control passageway upstream of said valve can member and valve seat, said bottom wall also having outlet means therein communicating the interior of said enclosure downstream of said valve seat with said valve module outlet passageway.

4. The combination set forth in claim 3 wherein said top wall of said enclosure comprises a cover removably engaged with the upper end of said enclosure side wall to facilitate assembly of said valve can and ball within the interior of said enclosure.

5. The combination set forth in claim 4 wherein said valve module includes filter media means disposed exteriorly of said enclosure and covering said at least one inlet opening of said valve module inlet passageway.

6. The combination set forth in claim 5 wherein said filter media means comprises an inverted, cup-like media retainer with an open array of ribs and having a filter media liner disposed interiorly therein and peripherally encircling said side wall and top of said valve module enclosure.

7. The combination set forth in claim 3 wherein said top wall of said valve module enclosure includes a standpipe extending upwardly therefrom within the reservoir of said canister, the upper end of said standpipe being open and disposed at an elevation slightly below the upper end of the canister and having a float valve operably associated therewith for closing the open upper end of said standpipe when the level of fuel in the canister drops therebelow and vice versa, said standpipe being open at its lower end to the interior of said valve module enclosure, and wherein the interior of said enclosure side wall has bypass passageway means therein for providing always open liquid fuel communication between said standpipe and said module outlet passageway in bypass relation to said valve seat and valve can member.

8. The combination set forth in claim 7 wherein said standpipe and top wall of said enclosure are formed as a one-piece member with said top wall having means for removably engaging the side wall of said module enclosure such that said canister top wall and standpipe are removable as a unit from said enclosure side wall to thereby facilitate assembly of said valve can and ball into the interior of said module enclosure.

9. The combination set forth in claim 3 wherein said canister has a bottom wall disposed above the main tank bottom wall with said module outlet passageway formed therein, said canister bottom wall having a main pump inlet passageway dependent therefrom with a foot check valve perably disposed therein for communicating the primary in-tank fuel filter with the pump inlet and preventing flow of liquid fuel from the canister reservoir via the module outlet passageway when the pump is not running, said module outlet passageway being connected in parallel flow relation with said canister-main tank fuel inlet passageway and foot valve relative to said pump inlet.

10. An improvement in fuel reservoirs having a submerged pump member which draws fluid from the interior of a tank bottom filter into an inlet of the pump and delivers the fluid to an engine and wherein a fuel return line dispenses excess fuel into a fuel tank having a floor, a secondary reservoir canister surrounding the fuel pump and being located to receive the return fuel from the engine and displaced vertically from the tank floor, and an inertia responsive valve means operatively connected between the canister secondary reservoir and the pump inlet for permitting fuel in said secondary reservoir to enter the pump inlet when the vehicle carrying the fuel tank is subjected to forces moving the tank fuel away from the tank filter and thereby starving the pump inlet flow from the tank via the filter, the improvement wherein said valve means comprises an annular valve seat structure and an associated valve-controlled passageway in full fuel flow communication between said secondary reservoir and the pump inlet, said valve seat structure comprising an open annulus having its axis oriented parallel to the normal vertically oriented axes of said fuel pump and fuel canister, a valve seat formed on the upper edge of said annulus with a sealing surface lying in a plane perpendicular to said vertical axes, a valve can member having a peripheral side wall and a bottom wall closing one end of said valve can member, the exterior undersurface of said can wall being adapted to seatably rest on said annular valve seat sealing surface to close communication between said canister inlet and outlet passageways, and a valve actuating ball loosely disposed on the upper interior surface of said can bottom wall and being diametrically dimensioned relative to the diameter of said can peripheral wall to permit said ball to roll back and forth on said can bottom wall within the confines of said can side wall, the outside diameter of said can being greater than diameter of said valve seat such that shifting of said ball off-center relative to the can center imparts tilting forces to the can to tiltably lift the same from the valve seat in response to the same forces acting on said ball in a direction transverse to the valve seat axis as those imparting the lateral bodily fuel shift in the fuel tank.

11. In a vehicle fuel system,
  (a) a main fuel tank,
  (b) a canister within said fuel tank having a fuel inlet from said main fuel tank and a fuel outlet,
  (c) a flow passage in said canister isolated from the interior of said canister and connected at one end to said fuel inlet and at the other end to said fuel outlet,
  (d) means forming a fuel port connecting said flow passage with the interior of said canister,
  (e) an intertia-type valve element in said means to close said port in one position and responsive to forces shifting a body of low level tank fuel away from said canister fuel inlet to thereby open said port to connect the fuel outlet with the interior of said canister, and
  (f) a standpipe in said canister have an inlet disposed slightly below the open upper end of the canister and an outlet arranged in always-open bypass flow relation to said valve element and associated port.

12. A fuel system as defined in claim 11 in which a fuel pump is connected to said fuel outlet of said canister, and a fuel return conduit leading to said canister is associated with a pressure regulator whereby return fuel from said pressure regulator is directed to said canister.

13. A fuel system as defined in claim 11 in which said means forming a fuel port comprises a chamber open at one side to said flow passage, said fuel port being located in a wall of said chamber, said valve element comprising a valve can member and associated actuating ball loosely confined on said can in said chamber having an at-rest position with said ball centered thereon closing said fuel port and a position responsive to the fuel shifting forces moving said ball relative to said valve can to thereby open said port allowing accumulated fuel in said canister to flow to said fuel outlet.

14. A fuel system as defined in claim 11 in which said fuel inlet is located at the bottom of said main fuel tank and said fuel outlet is connected to a fuel pump, and said fuel pump normally drawing fuel from said main fuel tank through said flow passage, a chamber formed in said flow passage having a bottom opening in communication with said flow passage and said fuel port in said chamber facing the top of said main fuel tank, said valve element comprising a valve can and associated actuating ball rollably confined therein, said can normally resting on and closing said port with said ball centered therein by gravity in the absence of said tank fuel shifting forces, and said ball being moved by such forces relative to said can to tilt said can and thereby open said port and allow fuel flow to said flow passage and said pump.

15. A fuel system as defined in claim 14 in which a check valve is positioned in said fuel inlet arranged to close the same when fuel is dumped from said canister into said flow passage.

* * * * *

UNITED STATES PATENT AND TRADEMARK OFFICE
CERTIFICATE OF CORRECTION

PATENT NO. : 5,560,342

DATED : October 1, 1996

INVENTOR(S) : Kirk D. Fournier and Charles H. Tuckey

It is certified that error appears in the above-indentified patent and that said Letters Patent is hereby corrected as shown below:

Col. 9, Line 2, change "diminishing" to "diminished".

Col. 14, Line 10, change "are" to "area".

Signed and Sealed this

Seventeenth Day of December, 1996

Attest:

BRUCE LEHMAN

*Attesting Officer*     *Commissioner of Patents and Trademarks*